United States Patent
Kremer et al.

(10) Patent No.: US 10,533,687 B2
(45) Date of Patent: Jan. 14, 2020

(54) COLLAPSIBLE FERRULE FOR HOSE COUPLER

(71) Applicant: Campbell Fittings, Inc., Boyertown, PA (US)

(72) Inventors: Randi Kremer, Barto, PA (US); Bruce Beck, Spring Mount, PA (US); Matthew Golemboski, Gilbertsville, PA (US); Matthew Hontz, Allentown, PA (US)

(73) Assignee: CAMPBELL FITTINGS, INC., Boyertown, PA (US)

( * ) Notice: Subject to any disclaimer, the term of this patent is extended or adjusted under 35 U.S.C. 154(b) by 749 days.

(21) Appl. No.: 15/180,701

(22) Filed: Jun. 13, 2016

(65) Prior Publication Data

US 2017/0356579 A1    Dec. 14, 2017

(51) Int. Cl.
*F16L 33/207*  (2006.01)

(52) U.S. Cl.
CPC ............... *F16L 33/2076* (2013.01)

(58) Field of Classification Search
CPC .................. F16L 33/2076; F16L 33/2071
USPC ............................ 285/242, 256, 382, 382.7
See application file for complete search history.

(56) References Cited

U.S. PATENT DOCUMENTS

| | | | |
|---|---|---|---|
| 2,374,225 A | 4/1945 | Melsom | |
| 2,570,421 A | 10/1951 | Baldwin | |
| 2,685,458 A * | 8/1954 | Shaw | F16L 33/01 |
| | | | 285/222.4 |
| 4,111,469 A | 9/1978 | Kavick | |
| 4,305,608 A | 12/1981 | Stuemky | |
| 4,335,753 A * | 6/1982 | Frye | F16L 33/24 |
| | | | 138/109 |
| 4,482,075 A * | 11/1984 | Stotz | B60K 15/0406 |
| | | | 220/301 |
| 4,548,430 A * | 10/1985 | Haubert | F16L 33/2078 |
| | | | 285/256 |
| 4,684,157 A | 8/1987 | Smith | |
| 5,722,150 A | 3/1998 | Swanson | |
| 5,984,376 A | 11/1999 | Lampe | |
| 6,796,586 B2 | 9/2004 | Werth | |

(Continued)

FOREIGN PATENT DOCUMENTS

| | | | | |
|---|---|---|---|---|
| DE | 9104415 U1 * | 8/1991 | ......... | F16L 33/2076 |
| EP | 0807781 | 11/1997 | | |

(Continued)

OTHER PUBLICATIONS

Crimp Ferrules & Sleeves for Rubber Hose, http://www.new-line.com/clamps/banding-ferrules-sleeves-strapping-and-punch-clamps/clamps-ferrules-sleeves-for-rubber-hose, uploaded Jul. 12, 2016, 4 pages.

*Primary Examiner* — Anna M Momper
*Assistant Examiner* — Fannie C Kee
(74) *Attorney, Agent, or Firm* — RatnerPrestia

(57) ABSTRACT

A ferrule for mounting a hose to a hose adapter, the ferrule including a substantially cylindrical hollow structure extending between a proximal end and a distal end, a flange at the proximal end of the ferrule that is configured to be connected to the hose adapter, and either one or more openings or compressible grooves formed on the flange that are configured to be compressed upon either swaging or crimping the flange to the hose adapter.

10 Claims, 20 Drawing Sheets

(56) References Cited

U.S. PATENT DOCUMENTS

| | | | | |
|---|---|---|---|---|
| 6,802,540 B2* | 10/2004 | Malone | ............... | F16L 13/141 |
| | | | | 285/256 |
| 7,014,218 B2 | 3/2006 | Fisher | | |
| 7,134,696 B2 | 11/2006 | Poll | | |
| 8,123,257 B1 | 2/2012 | Baer | | |
| 2003/0038478 A1* | 2/2003 | Humphreys | .......... | F16L 33/227 |
| | | | | 285/256 |
| 2014/0252763 A1 | 9/2014 | Flessa | | |

FOREIGN PATENT DOCUMENTS

| | | | | |
|---|---|---|---|---|
| EP | 1174653 | | 1/2002 | |
| EP | 1378700 | | 1/2004 | |
| JP | 2013241954 A | * | 12/2013 | .......... F16L 33/2076 |
| WO | 2014018860 | | 1/2014 | |

\* cited by examiner

US 10,533,687 B2

COLLAPSIBLE FERRULE FOR HOSE COUPLER

FIELD OF THE INVENTION

This invention relates to ferrules for flexible hoses.

BACKGROUND OF THE INVENTION

This invention relates generally to a coupling member that is to be installed on the end of a hose. As is described in U.S. Pat. No. 4,111,469 to Kavick, which is incorporated by reference herein in its entirety, the coupling member is securely installed on the end of the hose such that it will not become detached in service. The coupling member includes a hose adapter having a nipple or stem portion that is adapted to be inserted into the bore of the hose. A substantially concentric ferrule surrounds the hose adapter such that an annular space is formed between the ferrule and the hose adapter. The annular space is sized to receive the hose. After the end of the hose is loosely positioned in the annular space, the coupling member is placed in a swaging or crimping apparatus which reduces the diameter of the ferrule, thereby compressing the hose wall between the ferrule and the nipple of the hose adapter. The ferrule is sized to accommodate a specific hose diameter and wall thickness, which necessitates a large inventory of ferrules for accommodating hoses having various diameters and wall thicknesses. It would be advantageous to provide a ferrule that accommodates a wide variety of diameters and wall thicknesses without sacrificing the locking connection between the ferrule and the hose, or resulting in an unsightly connection created by a large ferrule connected to a significantly smaller hose.

SUMMARY OF THE INVENTION

According to one aspect of the invention, a hose coupler comprises a hose adapter including a body extending along a longitudinal axis and having opposing ends, an interior surface forming a fluid passage between the opposed ends, and an exterior surface including a series of barbs (optional) for engaging an interior surface of a hose. A ferrule at least partially encircles the exterior surface of the hose adapter and has an interior surface facing the exterior surface of the hose adapter. A space is formed between the interior surface of the ferrule and the exterior surface of the hose adapter for receiving a hose. One end of the ferrule includes a flange extending radially from the interior surface of the ferrule. The flange is connected to the hose adapter at an attachment point. At least one compressible groove is formed on the flange that is configured to be compressed upon mounting (e.g., either swaging or crimping) the flange to the hose adapter.

According to another aspect of the invention, a plurality of openings are formed on the flange that are configured to be compressed upon mounting the flange to the hose adapter.

According to yet another aspect of the invention, a ferrule for mounting a hose to a hose adapter is provided. The ferrule comprises a substantially cylindrical hollow structure extending between a proximal end and a distal end, a flange at the proximal end of the ferrule that is configured to be connected to the hose adapter, and either a plurality of openings or a plurality of compressible grooves formed on the flange that are configured to be compressed upon mounting (e.g., either swaging or crimping) the flange to the hose adapter.

BRIEF DESCRIPTION OF THE DRAWING FIGURES

DETAILED DESCRIPTION OF THE INVENTION

As used herein, the term 'fluid' encompasses gasses, liquids, slurries and/or partial solids.

Figure 1:
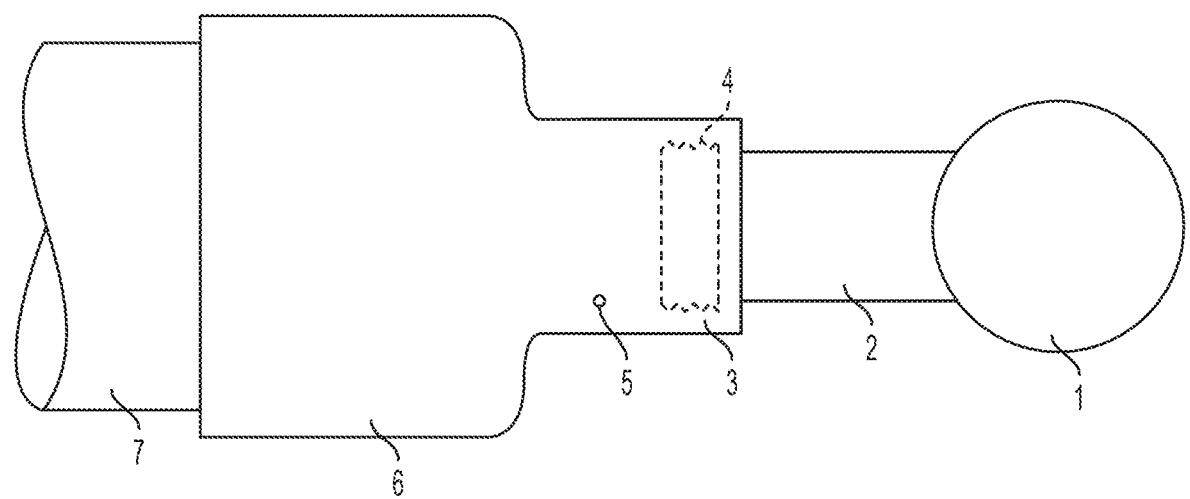
FIG. 1 depicts a schematic view of a hose connection in accordance with an exemplary embodiment of the present invention.

FIG. 1 depicts a schematic view of an exemplary hose connection including a coupler. As shown in FIG. 1, a fluid source 1 is connected to a hose 2. The hose 2 has a threaded female connector 3 on one end thereof. The female threaded connector 3 is threadedly connected to a threaded male connector 4 (shown in broken lines) of a hose coupler 5. The hose coupler 5 includes a ferrule 6, which is crimped to another hose 7. In operation, fluid travels from the fluid source 1, through the hose 2, through the hose coupler 5 and into the hose 7. It should be understood that the exemplary hose connection shown in the schematic view is provided for reference purposes only, and the hose coupler 5 (also referred to herein as a 'coupler') that is described herein is not limited to forming part of the exemplary hose connection.

Figure 2A:
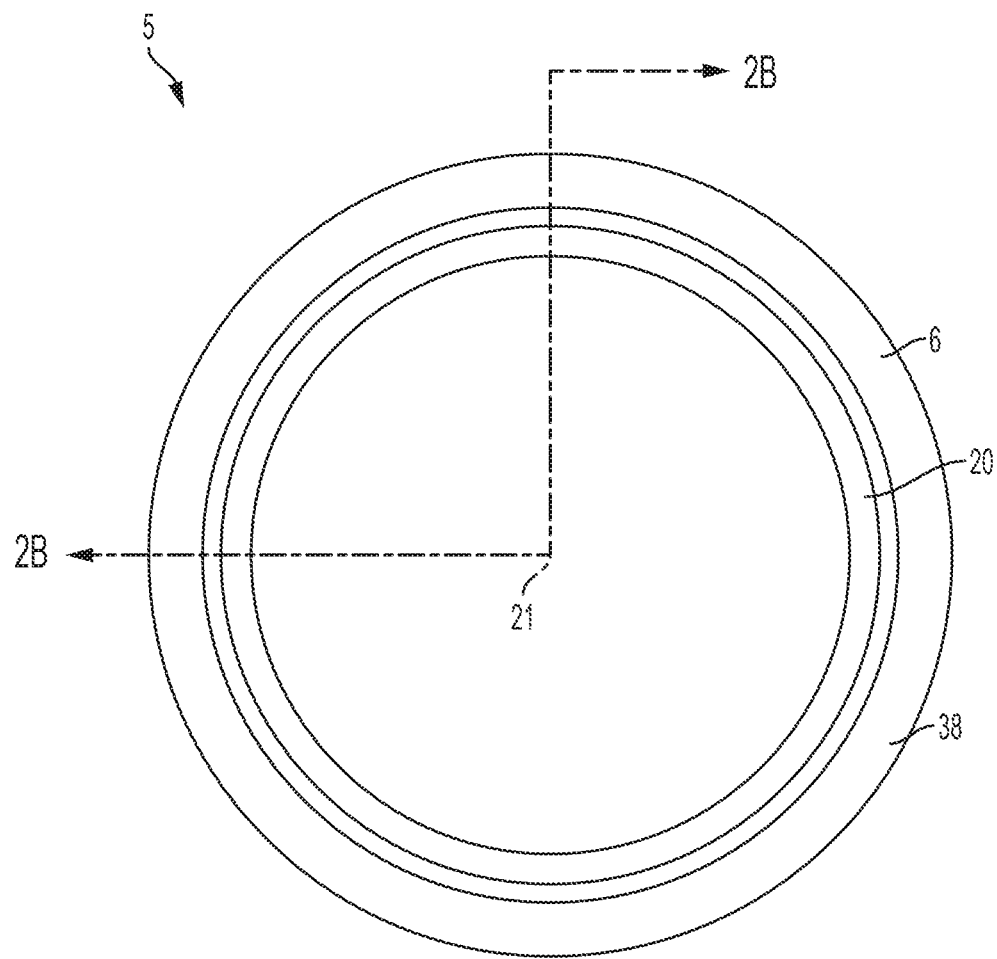
FIG. 2A depicts a bottom plan view of a coupler of the hose connection of FIG. 1.
Figure 2B:
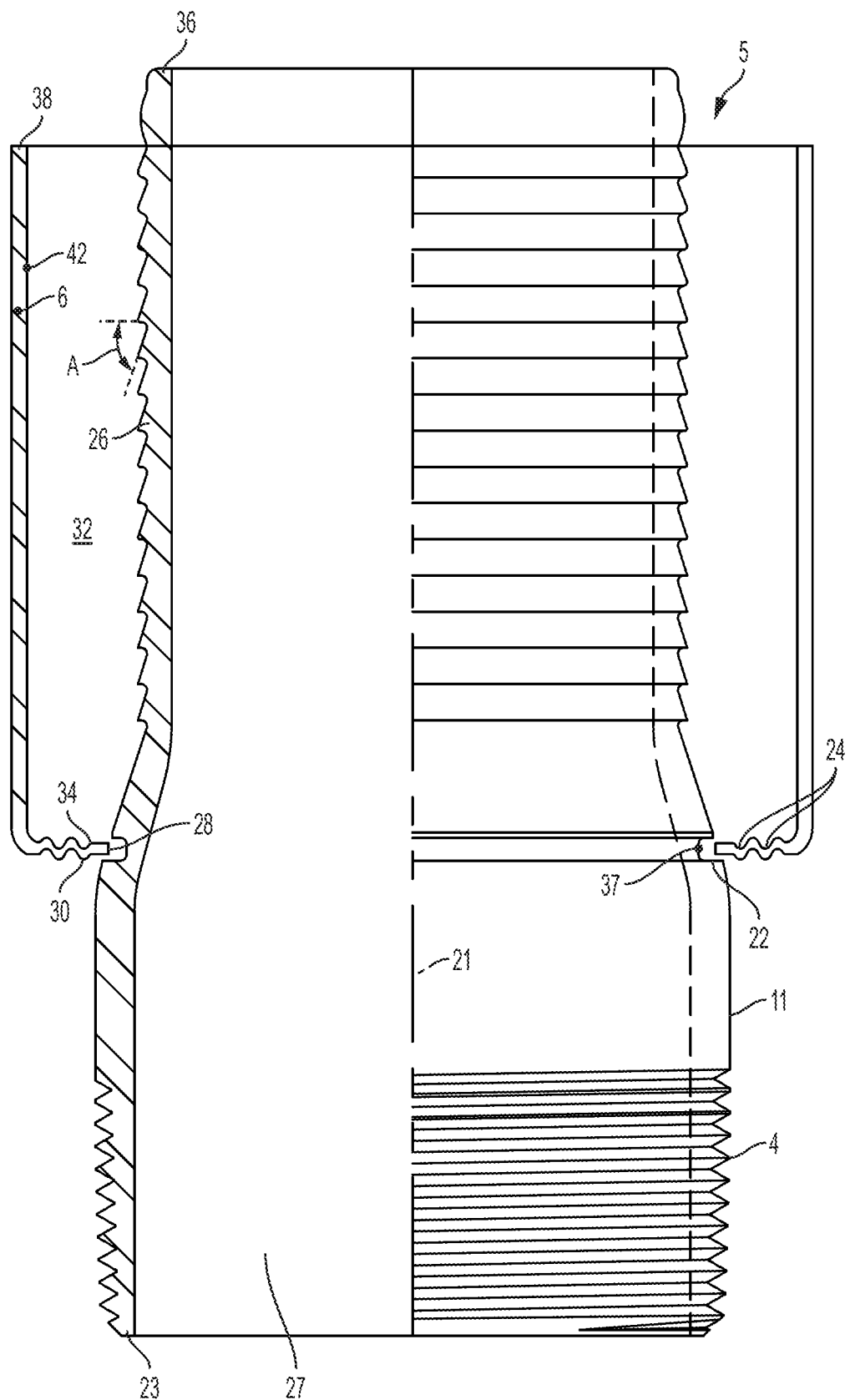
FIG. 2B depicts a partial cross-sectional view of the coupler of FIG. 2A taken along the lines 2B-2B, wherein various surfaces of the coupler are cut-away to reveal interior features of the coupler.

The features of the individual components of the coupler 5 will be described hereinafter with reference to FIGS. 2A and 2B. FIG. 2A is a bottom plan view of the coupler 5, according to a first example of the invention; and FIG. 2B is a partial cross-sectional view of the coupler 5 of FIG. 2A taken along the lines 2B-2B. Various surfaces are hidden in FIG. 2B to reveal interior features of the coupler 5.

Unless noted otherwise, the individual components and features of the coupler 5 are substantially cylindrical and are revolved about a longitudinal axis 21. Also, as used herein, the term "proximal" refers to either a location or a direction towards the mating surface 23 of the coupler 5, and the term "distal" refers to either a location or a direction away from the mating surface 23 of the coupler 5.

The coupler 5 generally comprises a hose adapter 20 and a ferrule 6 that is mounted in an annular groove 22 formed on an exterior surface of the hose adapter 20. The individual components of the coupler 5 may be composed of zinc plated wrought steel, zinc plated cast ductile iron, or stainless steel, for example, or any other material that is known to those of ordinary skill in the art.

The hose adapter 20 includes a substantially cylindrical body having a hollow interior region 27 through which fluid may pass. The revolved interior surface of the hose adapter 20 is smooth to limit the build-up of media thereupon. The inner diameter of the hose adapter 20 is larger at its proximal end than at its distal end.

The proximal end of the revolved exterior surface of the hose adapter 20 includes a connector 4 comprising male mechanical threads for releasably connecting to a female threaded connector, such as the female threaded connector 3 in FIG. 1. Those of ordinary skill in the art will recognize that the connection means at the proximal end of the hose adapter 20 may vary from that which is shown and described. For example, although not shown, the connector 4 may be a clip, clamp, barb, fastener, or mating surface.

One or more flat surfaces 11 may be formed on the exterior surface of the adapter 20 at a location distal of the connector 4 and proximal of the ferrule 6 for accommodating a standard tool, such as a wrench. The tool is used to mount the coupler 5 to a mating connector, such as the female threaded connector 3 in FIG. 1. Although not shown, the connector 4 may terminate at a flange that is formed on the exterior surface of the hose adapter 20 at a location distal of the connector 4 and proximal of the ferrule 6. The flat surfaces 11 may be formed on the flange. The flat surfaces 11 and the flange are optional features of adapter 20.

The annular groove 22 of adapter 20 is formed on the exterior surface of the hose adapter 20 at a location distal of the connector 4. The proximal end of the ferrule 6 is positioned in the groove 22, as shown in FIG. 2B.

The distal end of the revolved exterior surface of the hose adapter 20 includes a hose fitting 26. The hose fitting 26 is located at a position that is distal of the groove 22. The hose fitting 26 comprises a series of barbs that are spaced apart along the length of the distal end of the hose adapter 20. The barbs are configured to engage the interior surface of a hose, such as the hose 7 shown in FIG. 1. According to one example of the coupler 5, the hose fitting 26 is a 3 inch male NPT-style connector. Each barb includes a substantially planar surface that is orthogonal to the longitudinal axis 21, and an angled surface that extends from the exterior surface of the hose adapter 20 in a proximal direction (e.g., toward connector 4). The angled surface and the planar surface form an acute angle 'A.' The angle 'A' of the barbs substantially limits or prevents the hose 7 from moving in the distal direction and withdrawing from the coupler 5. Those of ordinary skill in the art will recognize that other hose fittings exist, and may be incorporated into the hose adapter 20 without departing from either the scope or the spirit of the invention.

Figure 3A:
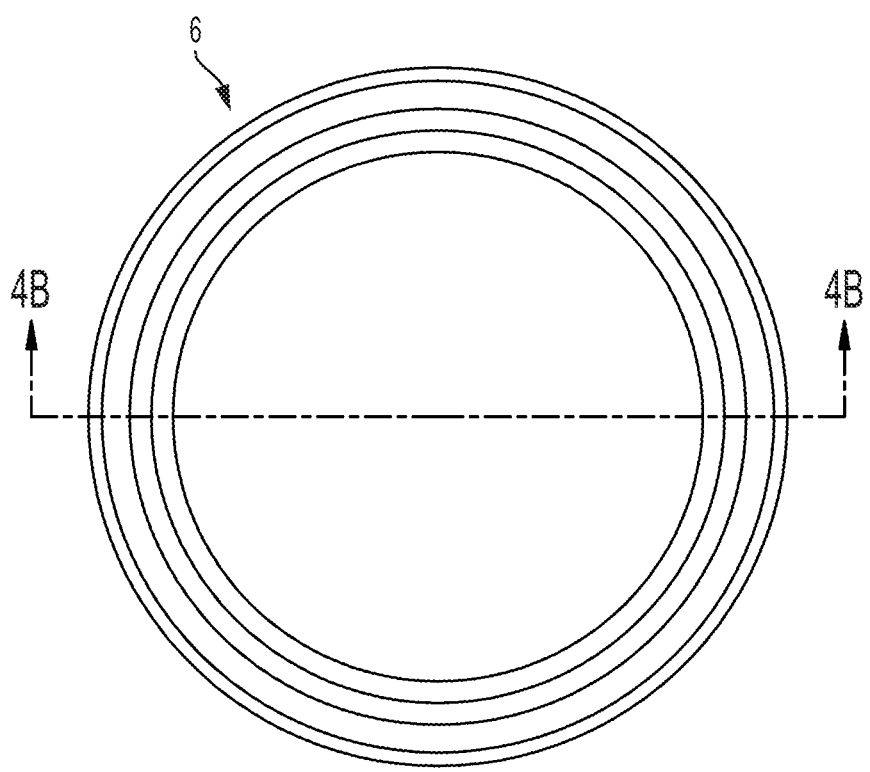
FIG. 3A depicts a bottom plan view of a ferrule of the coupler of FIGS. 2A and 2B.
Figure 3B:
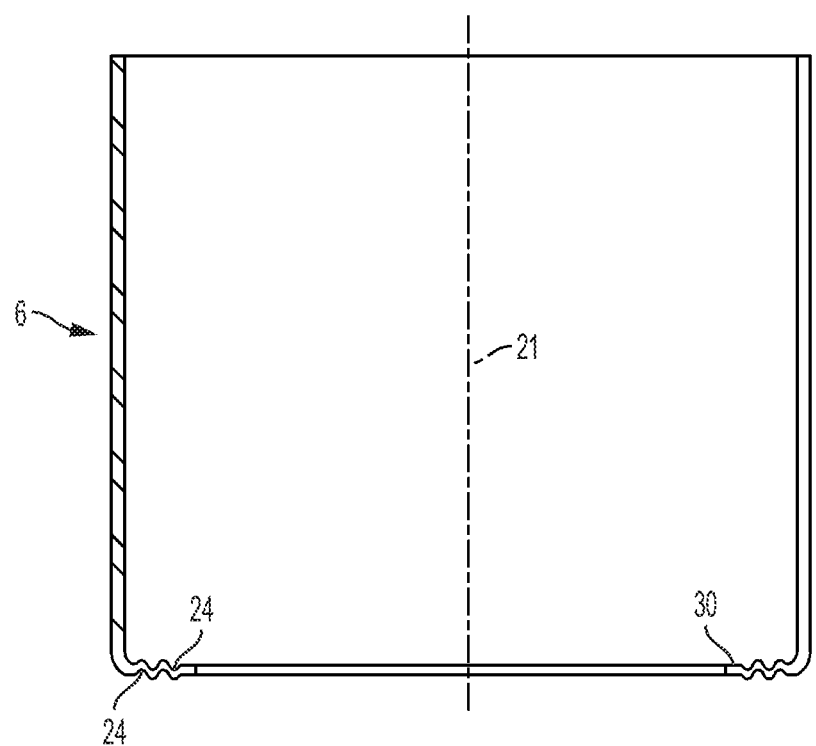
FIG. 3B depicts a cross-sectional view of the ferrule of FIG. 3A taken along the lines 3B-3B.

FIGS. 3A and 3B depict detailed views of the ferrule 6. The ferrule 6 is used as a compression member, creating hose wall compression between the inside surface 42 of the ferrule 6 and the hose stem residing inside of the inner diameter of the rubber hose 7. The hose wall compression takes place when the ferrule 6 is crimped around the rubber hose 7.

According to this example of the invention, the ferrule 6 is formed from a sheet metal pipe. Alternatively, the ferrule may be made from formed sheet metal or tubing, or, the ferrule may also be fully machined from either heavy tube or pipe or may even be solid.

The ferrule 6 comprises a substantially cylindrical hollow body having a substantially constant wall thickness. The outer and inner surfaces of the ferrule 6 are smooth and do not include any ribs or barbs. A shoulder or flange 3Q is formed at the proximal end of ferrule 6 for seating in groove 22 of the hose adapter 20. The flange 30 extends radially from the interior surface of the ferrule 6. Stated differently, the flange 30 extends non-parallel, perpendicular or obliquely with respect to the longitudinal axis 21 of the ferrule 6. According to this example of the invention, the flange 30 extends perpendicularly with respect to the longitudinal axis 21 of the ferrule 6.

The flange 30 of the ferrule 6 includes a series of encircling annular grooves 24 (three shown) defined on the distal and proximal facing surfaces of the flange 30 in an alternating fashion. Because the grooves 24 are stamped into the thin sheet metal of the flange 30, a protrusion is formed at the side of the flange 30 that is opposite each groove 24. The grooves 24 form an engineered crush/crumple zone that is configured to collapse in the radial direction upon crimping or swaging the ferrule 6 to the groove 22 in the adapter 20. The surfaces of the flange 30 may be referred to as wavy, rippled, corrugated, accordion-shaped, undulating or sinusoidal, for example. Each groove 24 may extend continuously around the entire outer circumference of the flange 30, or it may be non-continuous and extend around one or more portions of the circumference of the flange 30.

The flange 30 of the ferrule 6 is mounted in the groove 22 of the hose adapter 20 such that the ferrule 6 is fixedly mounted to the hose adapter 20. The area of engagement between the groove 22 and the flange 30 may be referred to herein as the attachment point between the ferrule 6 and the hose adapter 20. The ferrule 6 may be mounted to the hose adapter 20 by a crimping or swaging operation, which is described hereinafter.

In an assembled and pre-crimped configuration of the coupler 5, the ferrule 6 is positioned around the hose adapter 20 and the flange 30 is aligned with the groove 22, as shown in FIG. 2B. In this position of ferrule 6, an annular space 32 is formed between the interior surface of the ferrule 6 and the exterior surface of the distal end of the hose adapter 20. The distal end 36 of the hose adapter 20 extends beyond the distal end 38 of the ferrule 6 for at least the purpose of initially locating the bore of the hose 7 on the hose adapter 20 prior to advancing the hose 7 into the annular space 32. Although not shown, the end of the hose 7 may bear on the interior surface 34 at the proximal end of the ferrule 6.

To mount the hose 7 to the coupler 5, the hose 7 is first slid over the hose adapter 20 and delivered into the annular space 32 until the free end of the hose 7 either contacts or approaches the interior surface 34 of the ferrule 6. The ferrule 6 is then placed in a swaging or crimping tool which reduces the diameter of the ferrule 6, thereby compressing the wall of the hose 7 between the ferrule 6 and the hose fitting 26 of the hose adapter 20. The ferrule 6 is shown pre-crimped in the figures.

During the crimping process, the grooves 24 of the flange 3Q collapse and reduce in diameter as the flange 30 interlocks with the base surface 37 (see FIG. 2B) of groove 22 of the adapter 20. By virtue of the geometry of grooves 24, the ferrule 6 can undergo a reduction in its diameter while retaining its cylindrical shape and without buckling in an axial direction. The purpose of grooves 24 is to increase the crimping range of the ferrule 6, thereby accommodating a wider range of hose diameters and thicknesses as compared with known prior art ferrule designs.

Nearing the end of the crimping process, the interior revolved surface 42 of ferrule 6 compresses the interior surface of the hose 7 against the barbs of the hose fitting 26. The barbs of the hose fitting 26 either may or may not pierce the interior surface of the hose 7. The barbs of the hose fitting 26 help to retain the hose 7 in its assembled position within the coupler 5 and also prevent delamination of the hose layers under high temperature and/or pressure conditions.

The crimping range of known prior art ferrules (i.e., which do not include any grooves 24 or other collapsible features) is typically limited because the ferrules do not collapse, i.e., the ferrules reduce in diameter until they contact the base of the interlocking groove. Those prior art ferrules have a limit to their reduction range, i.e., they are limited by the flange that makes physical contact with the base of the groove in the adapter, then the flange has no place to go, thus the crimping operation must cease. In contrast, once the proximal end surface 28 (see FIG. 2B) of ferrule 6 contacts the base surface 37 of the adapter groove 22 during the crimping operation, the flange 30 of ferrule 6 is still capable of reducing further in diameter because further crimping of the ferrule 6 causes the grooves 24 to buckle. Thus, the ferrule 6 offers a greater crimping range and can accommodate a greater range of hose thicknesses and diameters than known prior art ferrules. Accordingly, the ferrule 6 provides a significant inventory cost savings. For example, the ferrule 6 can replace eight to ten different specific sizes of prior art ferrules in one nominal hose size family as a result of its increased crimping range, and the ferrule 6 can be used with all hose wall thicknesses in that nominal hose size family. The consequent reduction in total parts for inventory purposes is significant.

While ferrule 6 includes grooves 24 that enable collapse of the ferrule 6, other collapse mechanisms are envisioned, and are described hereinafter.

Figure 4A:
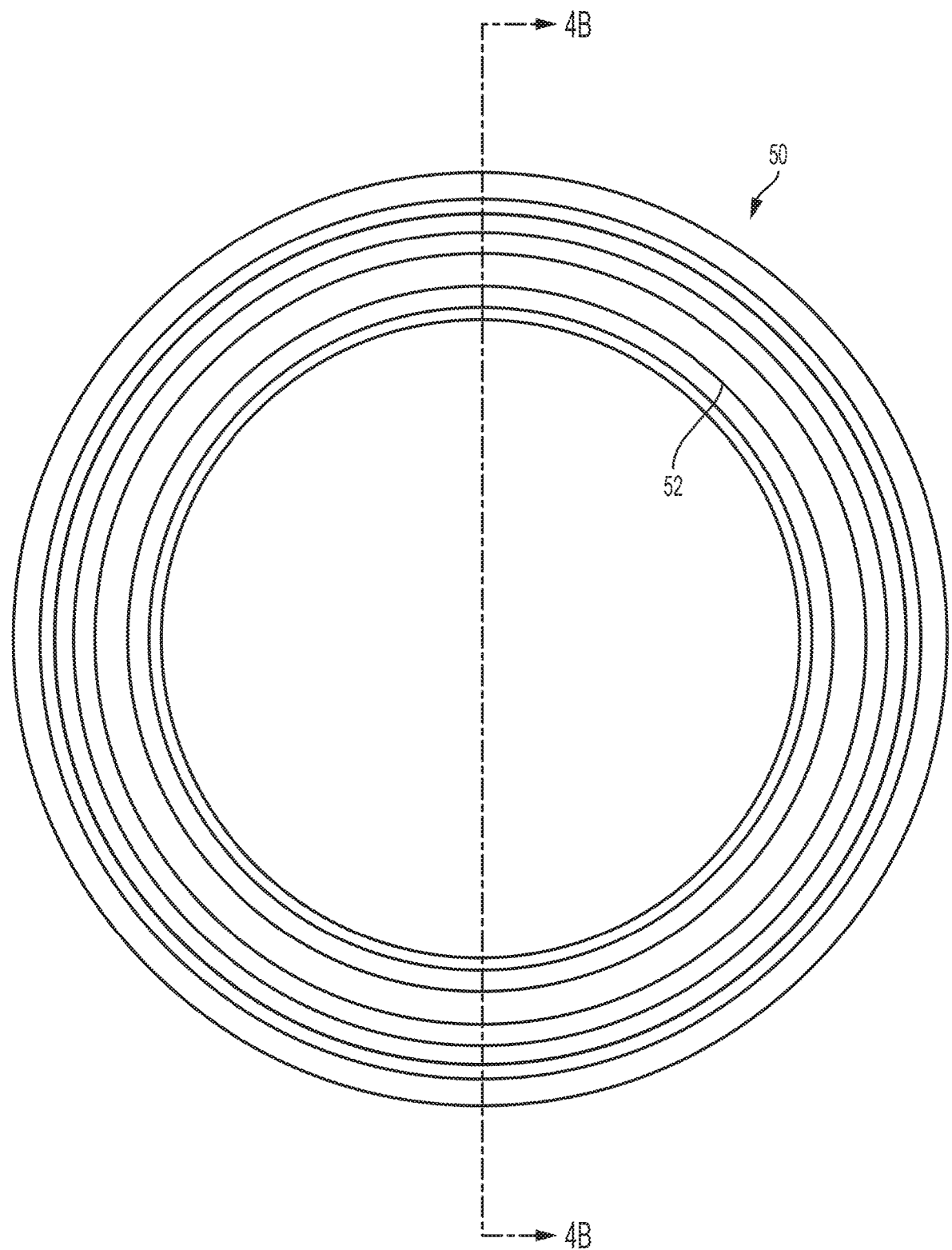
FIG. 4A depicts a bottom plan view of another coupler ferrule according to a second example of the invention.
Figure 4B:
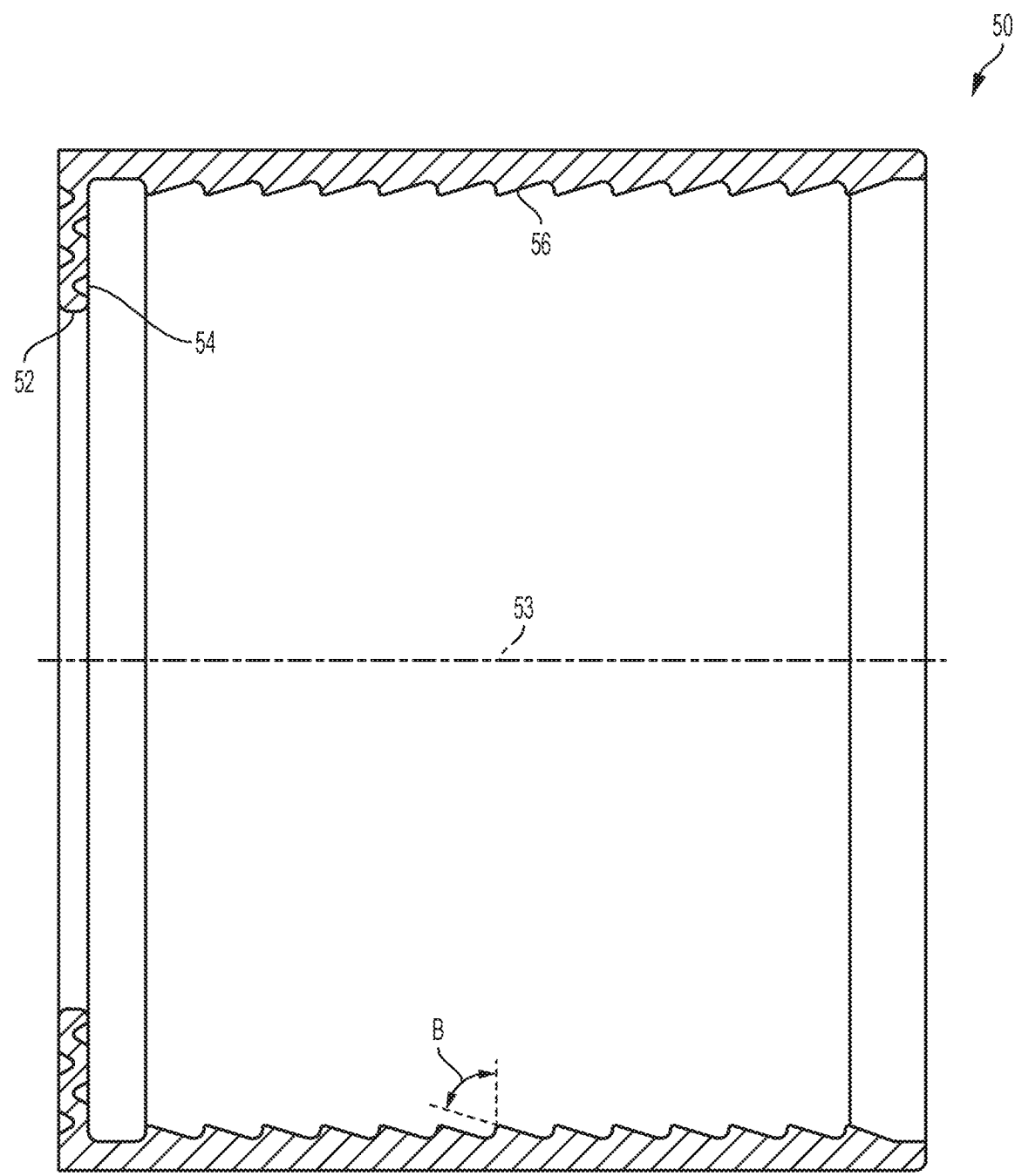
FIG. 4B depicts a cross-sectional view of the ferrule of FIG. 4A taken along the lines 4B-4B.

FIGS. 4A and 4B depict a coupler ferrule 50 according to a second example of the invention. The ferrule 50 is substantially similar to the ferrule 6 of FIG. 3B, and only the differences between those ferrules will be described hereinafter. Ferrule 50 is machined, as opposed to being formed from a sheet metal tube. Ferrule 50 could also be molded or cast.

Ferrule 5Q includes a flange 52 at its proximal end that extends in a radial direction toward the longitudinal axis 53. The flange 52 includes a series of encircling annular grooves 54 defined on the distal and proximal facing surfaces of the flange 52 in an alternating fashion. Like the above-described grooves 24, the grooves 54 are compressible and form an engineered crush zone that is configured to collapse upon crimping or swaging the ferrule 50 to the groove 22 in the adapter 20, as previously described. The flange 52 collapses in the radial direction, i.e., perpendicular to the longitudinal axis 53.

The interior surface of ferrule 50 includes a series of barbs 56 extending nearly the entire length of the ferrule 50. Each barb 56 includes a substantially planar surface that is orthogonal to the longitudinal axis, and an angled surface that extends from the interior surface of the hose adapter 20 in a proximal direction (e.g., toward flange 52). The angled surface and the planar surface form an acute angle 'B.' The angle 'B' of the barbs 56 substantially limits or prevents a hose 7 from moving in the distal direction and withdrawing from the ferrule 50 once the ferrule 50 is crimped to the adapter 20. The barbs of the ferrule 50 either may or may not pierce the interior surface of the hose 7 for shielding purposes.

Figure 5A:
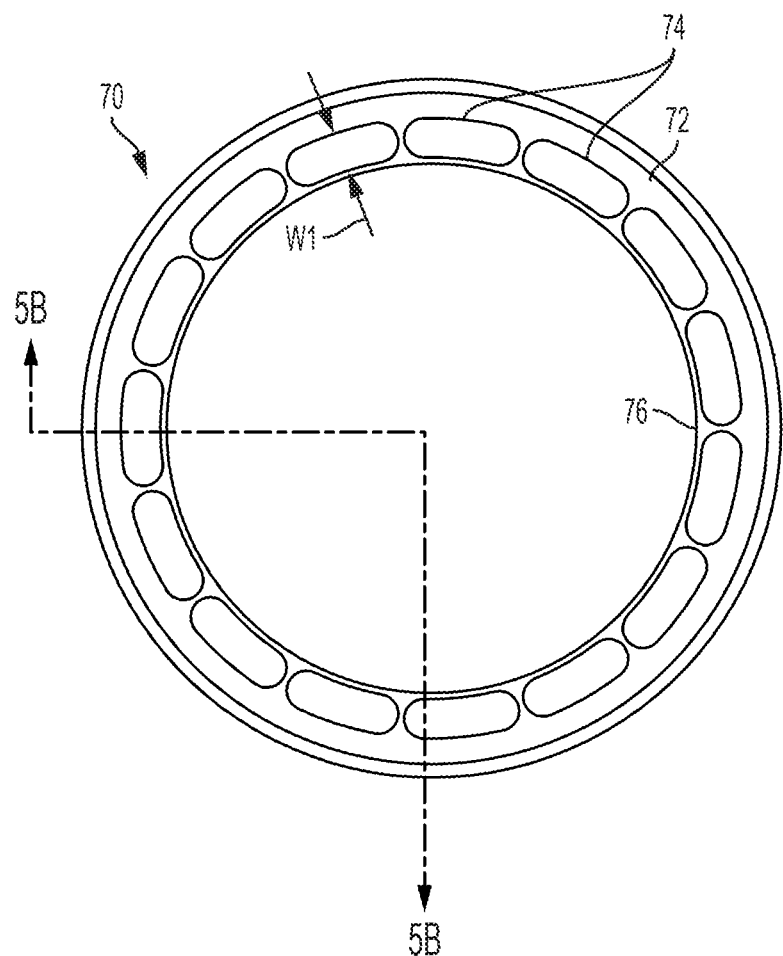
FIG. 5A depicts a bottom plan view of yet another coupler ferrule according to a third example of the invention.
Figure 5B:
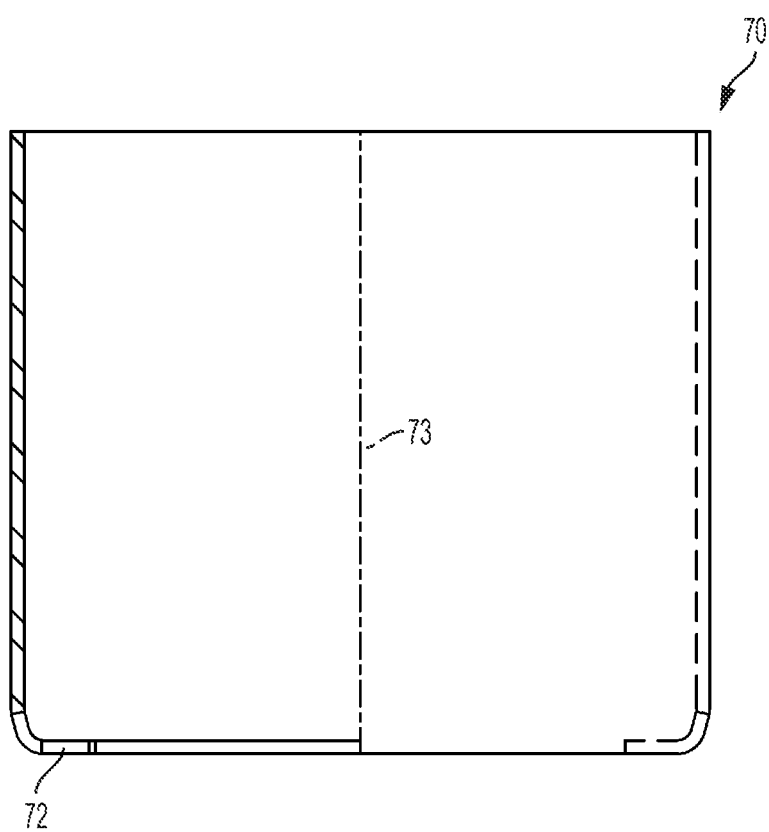
FIG. 5B depicts a cross-sectional view of the ferrule of FIG. 5A taken along the lines 5B-5B.

FIGS. 5A and 5B depict a coupler ferrule 70 according to a third example of the invention. The ferrule 70 is substantially similar to the ferrule 6 of FIG. 3B, and only the differences between those ferrules will be described hereinafter. Ferrule 70 includes a flange 72 at its proximal end that extends in a radial direction toward the longitudinal axis 73. The flange 72 includes a series of openings in the form of elongated crescent-shaped slots 74 that are positioned uniformly about the circumference of the flange 72. Like the above-described grooves 24, the slots 74 similarly form an engineered crush zone that is configured to collapse in the radial direction (i.e., perpendicular to axis 73) upon crimping or swaging the ferrule 70 to the groove 22 in the adapter 20, as previously described. Ferrule 70 may be formed from a sheet metal tube and the slots 74 may be formed by a stamping operation. Upon swaging the ferrule 70, the flange 72 buckles at the narrowed material space 78 between slots 74 and the width "W1" of each slot 74 decreases as the free edge 76 of the flange 72 bears on the base of the groove 22.

Figure 6A:
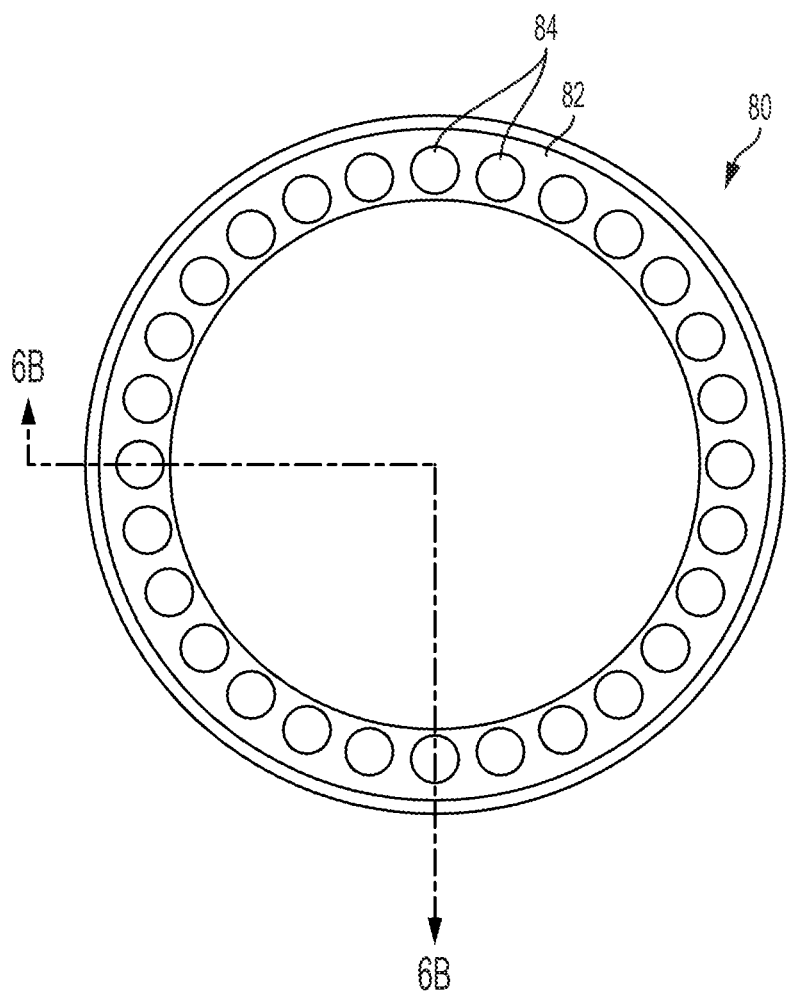
FIG. 6A depicts a bottom plan view of still another coupler ferrule according to a fourth example of the invention.
Figure 6B:
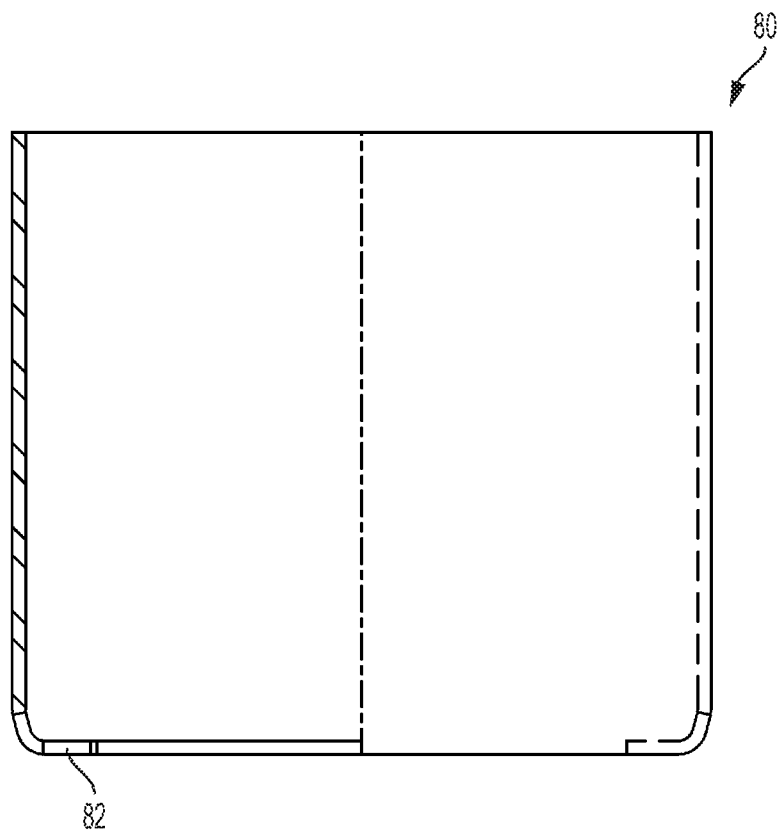
FIG. 6B depicts a cross-sectional view of the ferrule of FIG. 6A taken along the lines 6B-6B.

FIGS. 6A and 6B depict a coupler ferrule 80 according to a fourth example of the invention. The ferrule 80 is substantially similar to the ferrule 70 of FIGS. 5A and 5B, and the only difference between those ferrules is that the slots 74 are replaced by openings in the form of circular holes 84 on the flange 82. It is envisioned that the shape, number, size and/or position of the slots and/or holes of a ferrule can vary to achieve a desired deformation of a ferrule.

Figure 7A:
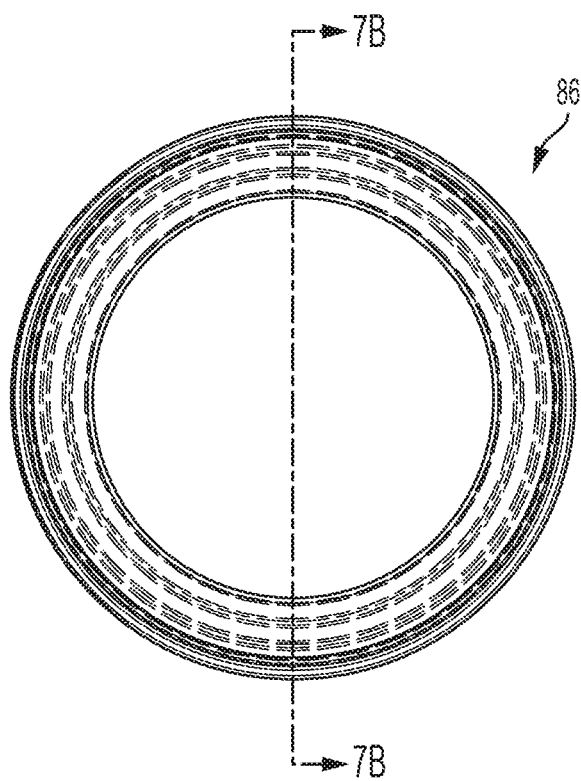
FIG. 7A depicts a bottom plan view of still another coupler ferrule according to a fifth example of the invention.
Figure 7B:
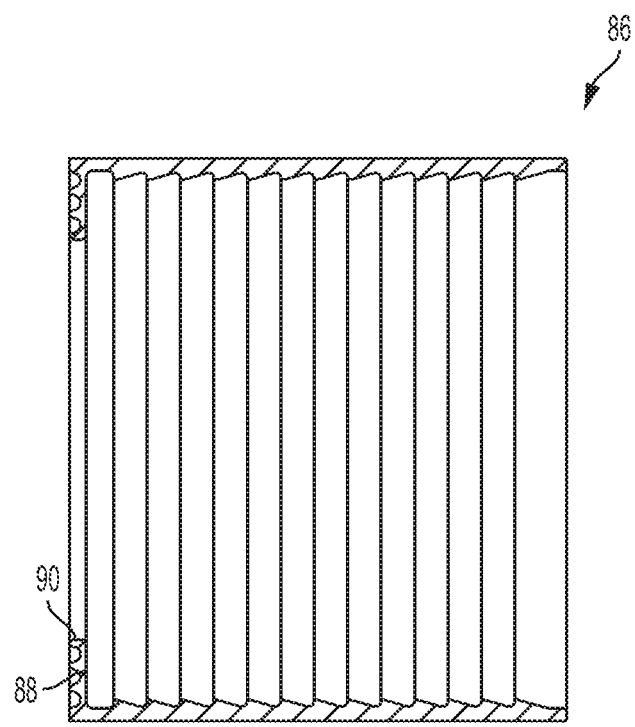
FIG. 7B depicts a cross-sectional view of the ferrule of FIG. 7A taken along the lines 7B-7B.

FIGS. 7A and 7B depict a coupler ferrule 86 according to a fifth example of the invention. The ferrule 86 is substantially similar to the ferrule 50 of FIGS. 4A and 4B, and the primary difference between those ferrules is that the annular grooves 88 of ferrule 86 are only disposed on the proximal surface of the flange 90.

Figure 8A:
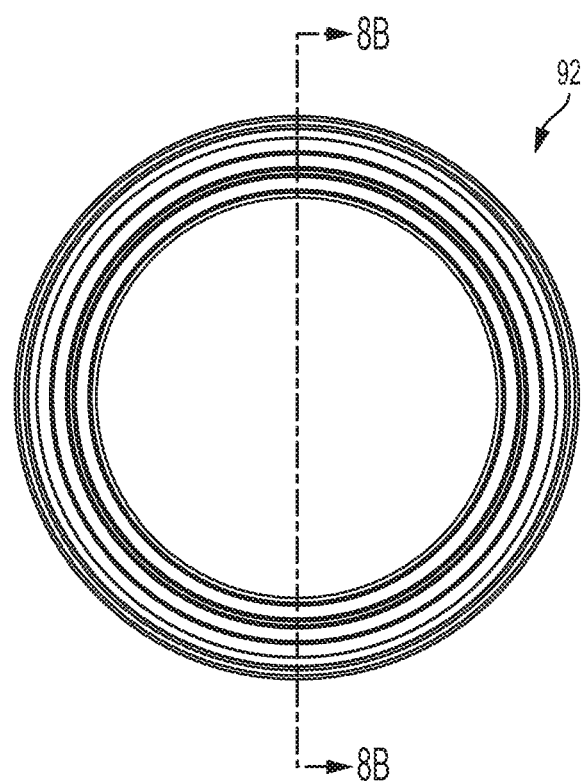
FIG. 8A depicts a bottom plan view of still another coupler ferrule according to a sixth example of the invention.
Figure 8B:
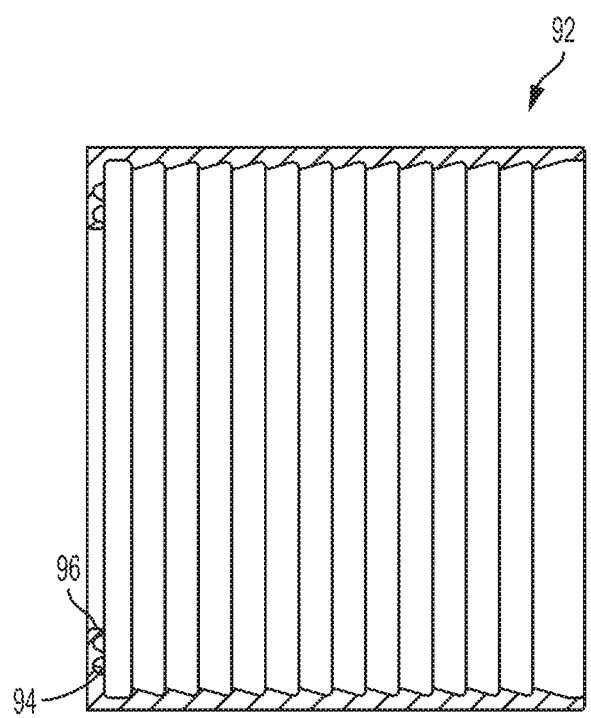
FIG. 8B depicts a cross-sectional view of the ferrule of FIG. 8A taken along the lines 8B-8B.

FIGS. 8A and 8B depict a coupler ferrule 92 according to a sixth example of the invention. The ferrule 92 is substantially similar to the ferrule 50 of FIGS. 4A and 4B, and the primary difference between those ferrules is that the annular grooves 94 of ferrule 92 are only disposed on the distal surface of the flange 96.

Figure 9A:
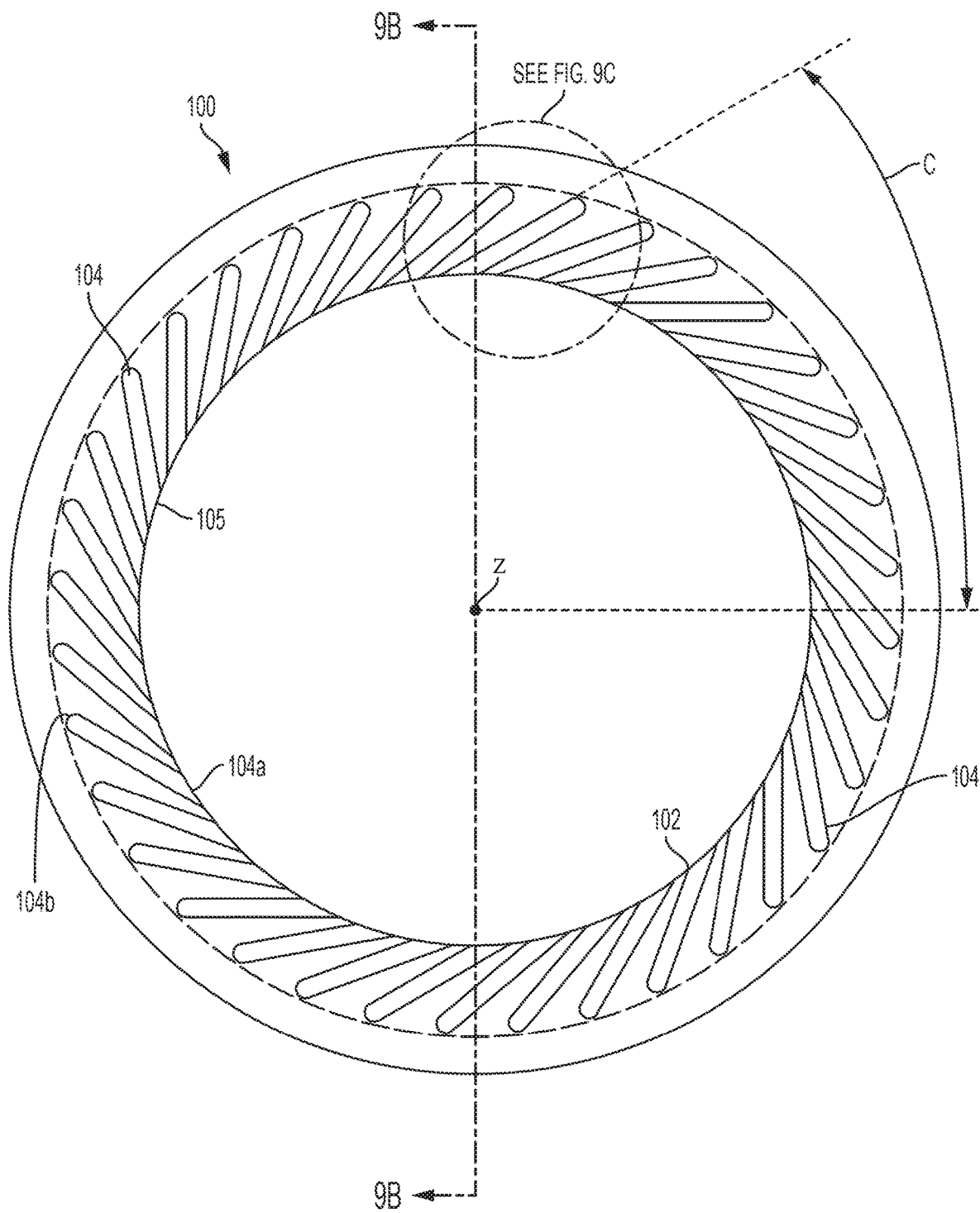
FIG. 9A depicts a bottom plan view of still another coupler ferrule according to a seventh example of the invention.
Figure 9B:
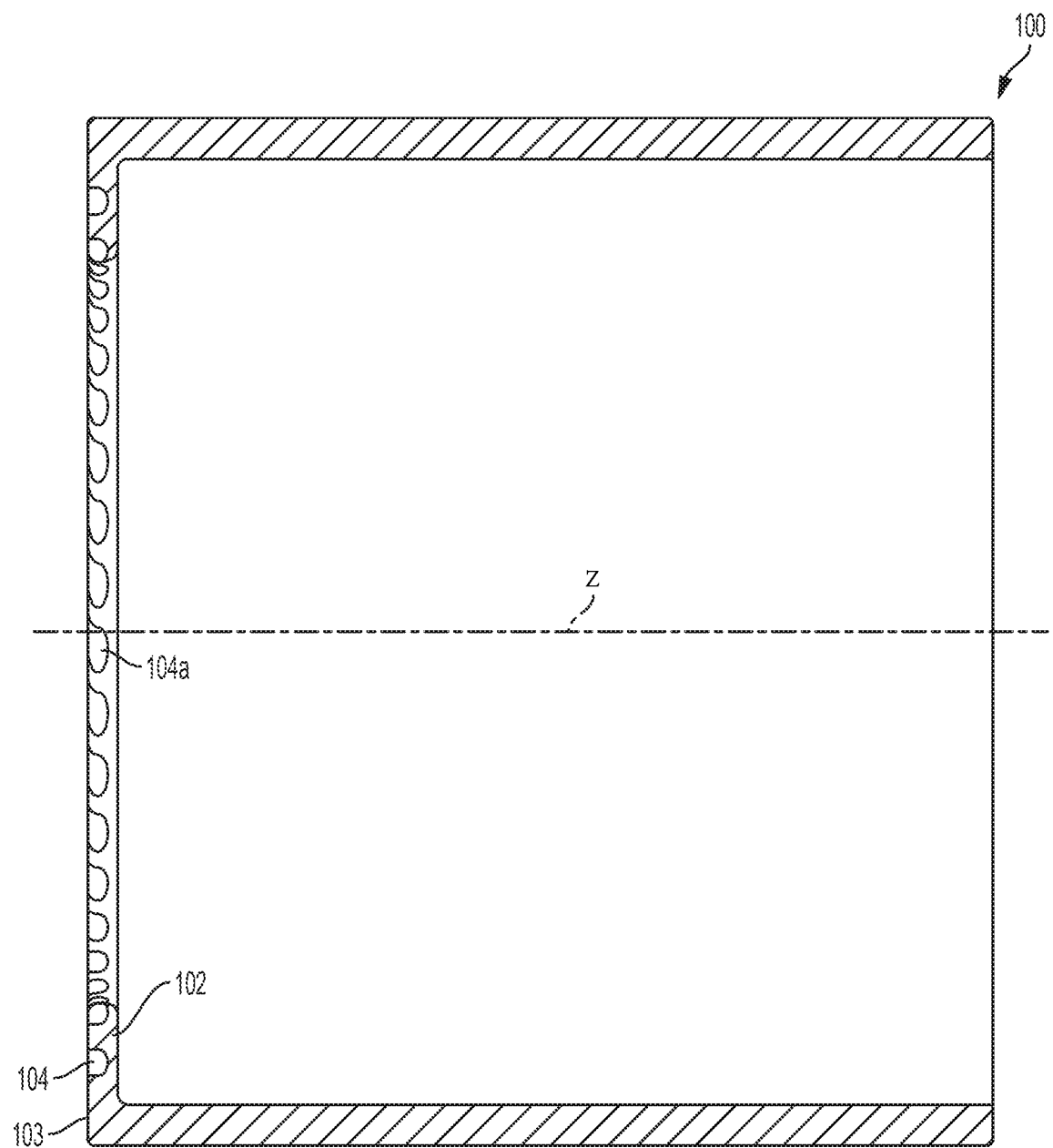
FIG. 9B depicts a cross-sectional view of the ferrule of FIG. 9A taken along the lines 9B-9B.
Figure 9C:
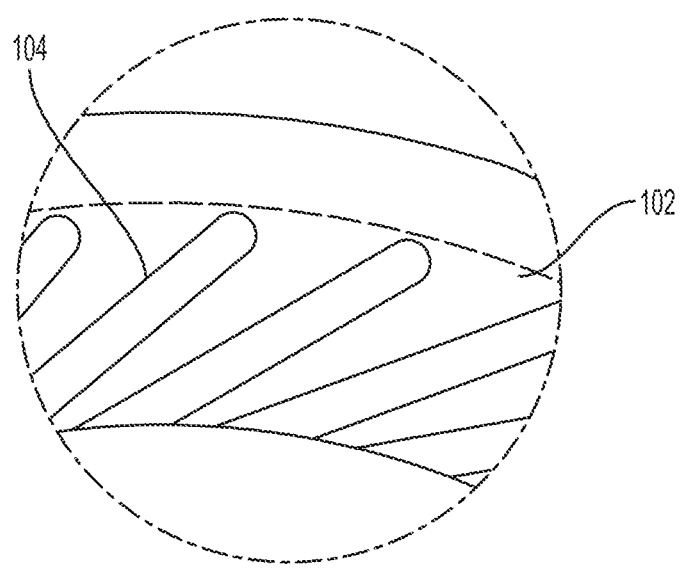
FIG. 9C depicts a detailed view of the ferrule of FIG. 9A at inset.

FIGS. 9A-9C depict a coupler ferrule 100 according to a seventh example of the invention. The ferrule 100 is substantially similar to the ferrule 70 of FIGS. 5A and 5B, and the primary differences between those ferrules will be described hereinafter. The flange 102 of ferrule 100 includes a series of tangential grooves 104 disposed along the proximal surface 103 of the flange 102. Each groove 104 extends obliquely with respect to the longitudinal axis Z of the ferrule 100. Each groove 104 is a depression in the proximal surface 103 of the flange 102. Each groove 104 extends between an open end 104a at the inner diameter 105 of the flange 102 and a closed end 104b that is radially outward of the inner diameter 105. The grooves 104 are uniformly spaced about the circumference of the flange 102.

The tangential angle 'C' of each groove 104 is about 30 degrees, for example. The tangential angle may be defined as the angle between the tangent line (i.e., groove 104) and the curve (i.e., the inner diameter 105) at the given point and the x-axis, or the tangential angle may be defined as the angular deviation of the groove 104 from the direction of the inner diameter 105. It is envisioned that the angle, shape, number, size and/or position of the grooves 104 can vary to achieve a desired deformation of a ferrule. Ferrule 100 may be machined, cast or molded, for example.

Figure 10:
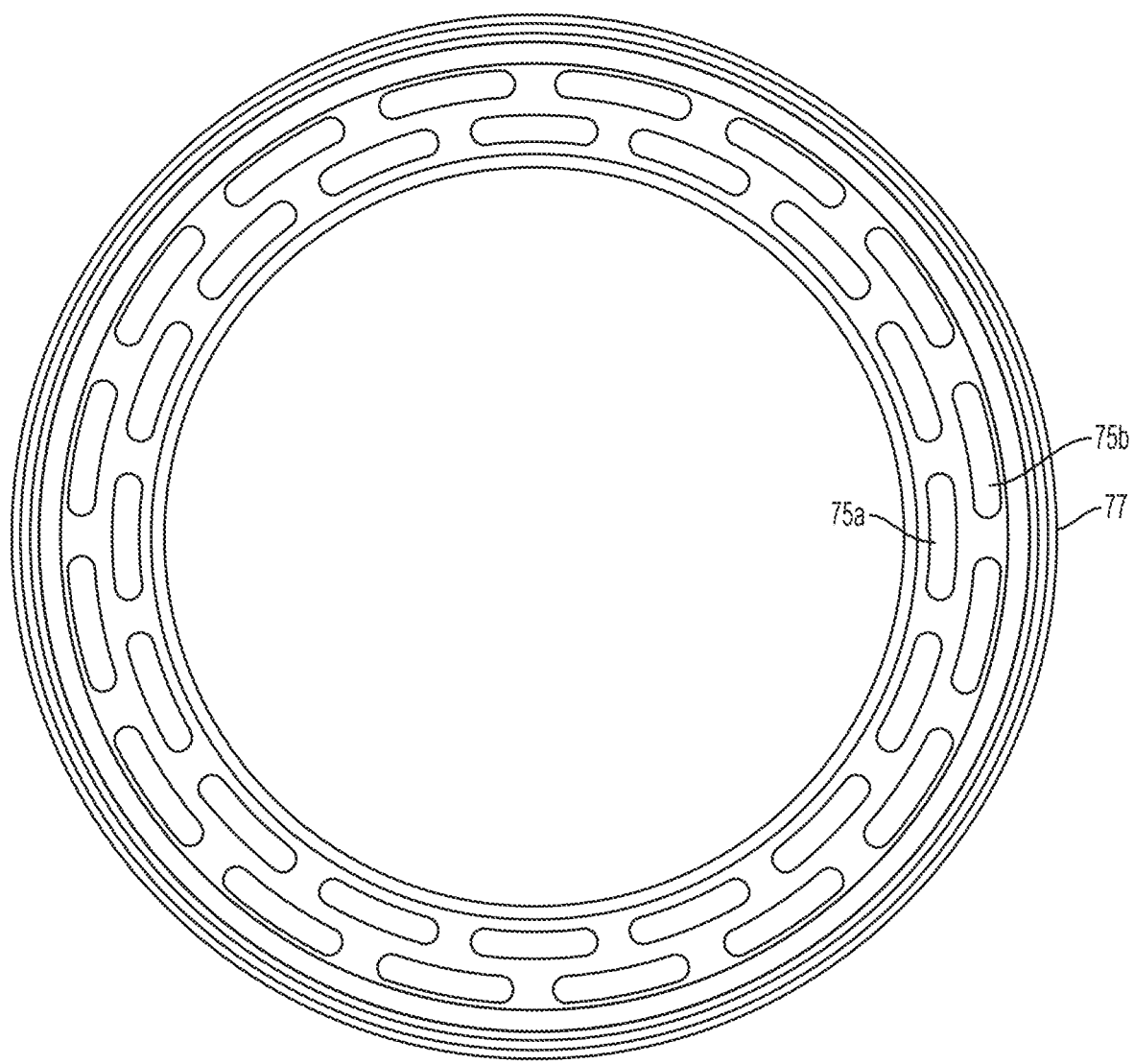
FIG. 10 depicts a top plan view of yet another coupler ferrule according to an eighth example of the invention.

FIG. 10 depicts a top plan view of yet another coupler ferrule 77 according to an eighth example of the invention. The ferrule 77 is substantially similar to the ferrule 70 of FIGS. 5A and 5B, and the only difference between those ferrules is that the ferrule 77 includes two concentric rows of elongated slots, i.e., a row of inner slots 75a and a row of outer slots 75b. Each row of slots includes sixteen slots, however, that number could vary. The number of rows could also vary. The dimensions of the slots 75a and 75b are substantially equal, according to this example, however, they may also vary. The row of inner slots 75a is radially offset from the row of outer slots 75b by 11.25 degrees (i.e., 180 degrees divided by the number of slots per row). Stated differently, the center of each slot 75a is located equidistant from the centers of the nearest slots 75b, and vice versa. The eighth example of the invention may be considered as the preferred embodiment from the manufacturing and performance perspectives.

Figure 11:
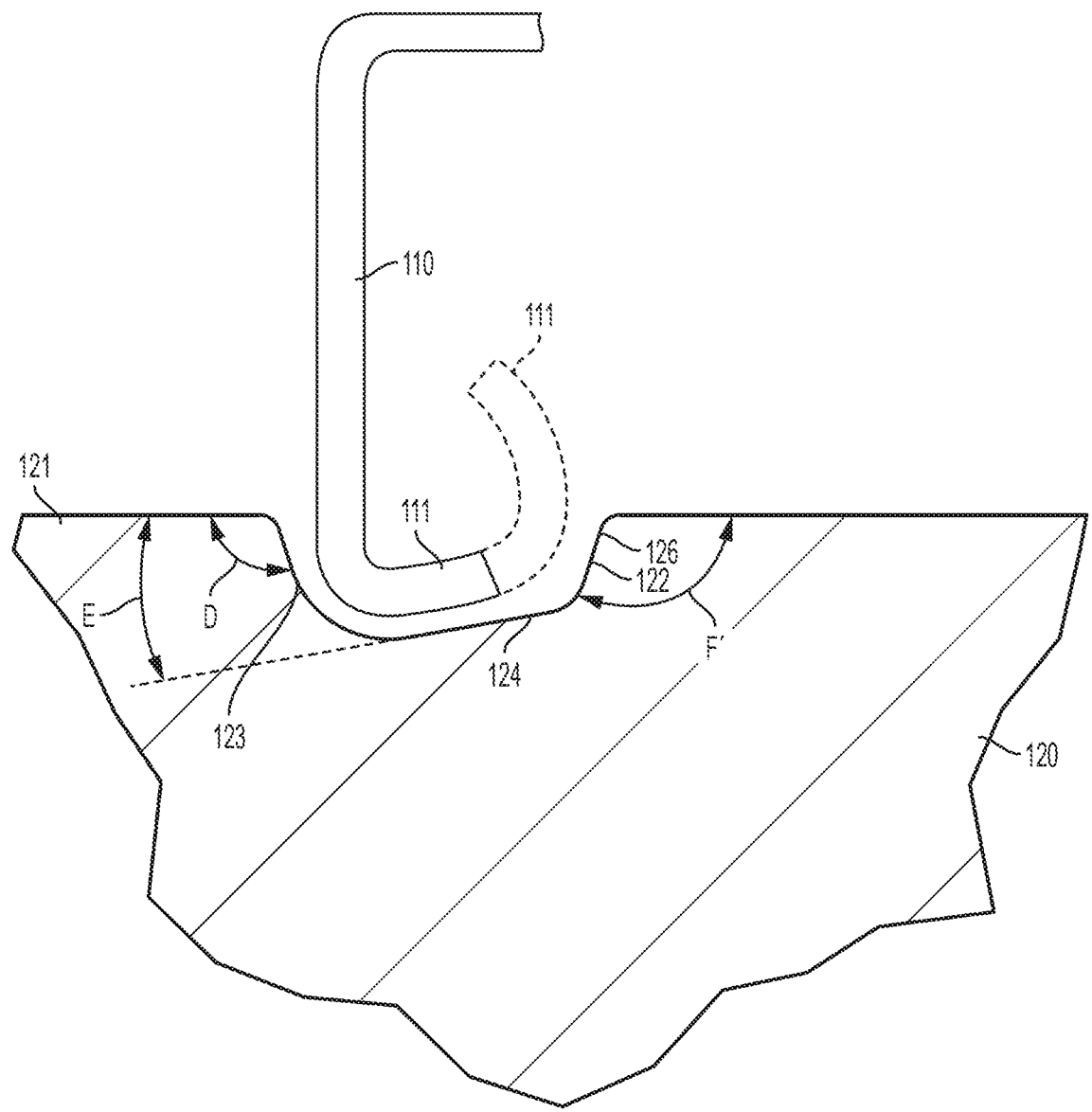
FIG. 11 depicts a schematic view of a ferrule flange engaging an alternative groove in an adapter.

As another alternative to the above-described engineered crush zones, the depth and/or shape of the groove 22 may vary along the circumference of the adapter 20 to permit additional deformation of the proximal edge of the flange of a ferrule. FIG. 11 depicts one such alternative.

FIG. 11 depicts a schematic view of a ferrule flange engaging an alternative groove in an adapter. Unlike the above-described ferrule flanges, the ferrule flange 110 may not include any engineered crush zones in the form of holes, slots or grooves, rather, the groove 122 in the adapter 120 is specially adapted to cause the flange 110 to curl and deform in a radially outward direction upon crimping the flange 110 to the adapter 120, as indicated by the phantom lines in FIG. 11. Also, unlike the above-described ferrule flanges, the ferrule flange 110 includes a perpendicular shoulder 111 on its free end. An acute angle 'E' of about 10 degrees is formed between the flange 110 and the exterior surface 121 of the adapter 120.

More particularly, the groove 122 includes a proximal surface 123 that extends from the exterior surface 121 of the adapter 120 in a distal and radially inward direction. An interior angle 'D' of about 108 degrees is defined between the exterior surface 121 and the proximal surface 123. The proximal surface 123 intersects an angled surface 124 at a radiused corner. The angled surface 124 extends from the proximal surface in a distal and radially outward direction. An interior angle 'E' of about 10 degrees is also defined between the exterior surface 121 and the angled surface 124. The angled surface 124 intersects a distal surface 126 at a radiused corner. The distal surface 126 extends from the angled surface 124 in a distal and radially outward direction. An interior angle 'F' of about 108 degrees is defined between the exterior surface 121 and the distal surface 126. The geometry of the radii and the surfaces 123, 124 and 126 of the groove 122 cause the flange 110 to curl and deform in a radially outward direction (as depicted by the broken line rendering of the flange 110) upon crimping the flange 110 to the adapter 120.

The groove 122 may extend continuously around the entire outer circumference of the adapter 120, or it may be non-continuous and extend around one or more portions of the outer circumference of the adapter 120. Also, the shoulder 111 may be non-continuous and extend around one or more portions of the flange 110.

Although the invention is illustrated and described herein with reference to specific examples, the invention is not intended to be limited to the details shown. Rather, various modifications may be made in the details within the scope and range of equivalents of the claims and without departing from the invention. For example, the diameter and length of the various components of the coupler 5 may vary to conform to different hose sizes. As another example, one or more barbs of the ferrules may extend continuously around the entire outer circumference of the ferrule, or they may be non-continuous and extend around one or more portions of the outer circumference of the ferrule.

What is claimed is:

1. A hose coupler comprising:
   a hose adapter including a body extending along a longitudinal axis and having opposing ends, an interior surface forming a fluid passage between the opposing ends, and an exterior surface for engaging an interior surface of a hose; and
   a ferrule at least partially encircling the exterior surface of the hose adapter and having an interior surface facing the exterior surface of the hose adapter, one end of the ferrule including a flange extending radially from the interior surface of the ferrule,
   a plurality of compressible grooves disposed on a first radial surface of the flange, the plurality of compressible grooves being configured to be compressed upon mounting the flange to the hose adapter, and
   a space formed between the interior surface of the ferrule and the exterior surface of the hose adapter for receiving a hose.

2. The hose coupler of claim 1, wherein the ferrule is formed of metal, and the plurality of compressible grooves are formed by a machining operation.

3. The hose coupler of claim 1 further comprising a connector formed on the hose adapter for connecting to a connector extending from another hose, pipe, tube, or machine.

4. The hose coupler of claim 1 wherein at least one of the plurality of compressible grooves at least partially encircling encircles another of the compressible grooves.

5. The hose coupler of claim 4, wherein the plurality of compressible grooves are spaced apart in a radial direction with respect to the longitudinal axis.

6. The hose coupler of claim 1, wherein a wall thickness of the entire ferrule is uniform prior to mounting the flange to the hose adapter.

7. The hose coupler of claim 1, wherein the ferrule includes a cylindrical wall and a series of barbs defined along a length of the cylindrical wall for engaging an exterior surface of the hose.

8. The hose coupler of claim 1, wherein each groove of the plurality of compressible grooves extends obliquely with respect to the longitudinal axis.

9. The hose coupler of claim 1 further comprising another plurality of compressible grooves disposed on a second radial surface of the flange that is opposite the first radial surface, said another plurality of compressible grooves being configured to be compressed upon mounting the flange to the hose adapter.

10. The hose coupler of claim 9, wherein the compressible grooves of the plurality of compressible grooves and said another plurality of compressible grooves are alternately arranged along a radial length of the flange.

\* \* \* \* \*